(12) United States Patent
Thomas et al.

(10) Patent No.: US 6,267,791 B1
(45) Date of Patent: *Jul. 31, 2001

(54) MIXTURES SUITABLE AS FUEL ADDITIVES

(75) Inventors: Juergen Thomas, Fussgoenheim; Peter Schreyer, Weinheim; Knut Oppenlaender, Ludwigshafen; Wolfgang Guenther, Mettenheim; Lothar Franz, Mutterstadt, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/495,593

(22) PCT Filed: Mar. 9, 1994

(86) PCT No.: PCT/EP94/00722

§ 371 Date: Aug. 2, 1995

§ 102(e) Date: Aug. 2, 1995

(87) PCT Pub. No.: WO94/21754

PCT Pub. Date: Sep. 29, 1994

(30) Foreign Application Priority Data

Mar. 20, 1993 (DE) ................................................ 43 09 074

(51) Int. Cl.⁷ ........................................................ C10L 1/22
(52) U.S. Cl. .................................. 44/412; 44/434; 44/424
(58) Field of Search ........................................ 44/412, 434

(56) References Cited

U.S. PATENT DOCUMENTS

| | | | |
|---|---|---|---|
| 3,440,029 | * 4/1969 | Little et al. ............................. | 44/434 |
| 4,391,610 | * 7/1983 | Sung et al. ............................. | 44/434 |
| 4,460,379 | * 7/1984 | Sweeney et al. ....................... | 44/434 |
| 4,604,103 | * 8/1986 | Campbell ............................... | 44/434 |
| 4,832,702 | 5/1989 | Kummer et al. ....................... | 44/412 |
| 4,877,416 | * 10/1989 | Campbell ............................... | 44/412 |
| 4,964,879 | * 10/1990 | Herbstman et al. .................... | 44/434 |
| 5,089,029 | 2/1992 | Hashimoto et al. .................... | 44/432 |
| 5,094,667 | * 3/1992 | Schilowitz et al. ..................... | 44/434 |
| 5,112,364 | 5/1992 | Rath et al. .............................. | 44/418 |
| 5,139,534 | * 8/1992 | Tomassen et al. ...................... | 44/412 |
| 5,242,469 | 9/1993 | Sakakibara et al. .................... | 44/347 |
| 5,264,006 | * 11/1993 | Schilowitz et al. ..................... | 44/434 |

FOREIGN PATENT DOCUMENTS

| | | |
|---|---|---|
| 244 616 | 11/1987 | (EP) . |
| 310 875 | 4/1989 | (EP) . |
| 356 725 | 3/1990 | (EP) . |
| 356 726 | 3/1990 | (EP) . |
| 440 248 | 8/1991 | (EP) . |
| 460 957 | 12/1991 | (EP) . |
| WO 91/03529 | 3/1991 | (WO) . |

OTHER PUBLICATIONS

The spark ignition . . . Fabri et al., Motor Fuels, vol. A 16 719.

* cited by examiner

*Primary Examiner*—Ellen M. McAvoy
(74) *Attorney, Agent, or Firm*—Keil & Weinkauf

(57) ABSTRACT

Mixtures of at least one amine, polyamine or alkanolamine and at least one polyetheramine and their use as additives for gasoline engine fuels.

9 Claims, No Drawings

MIXTURES SUITABLE AS FUEL ADDITIVES

The present invention relates to mixtures which are suitable as fuel additives and comprise essentially A) at least one amine, polyamine or alkanolamine, each of which carries a hydrocarbon radical having an average molecular weight of from 500 to 10,000 and B) at least one polyetheramine of the formula I

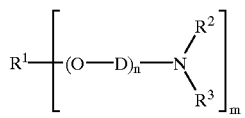

$$R^1 \left[ (O-D)_n - N \begin{matrix} R^2 \\ R^3 \end{matrix} \right]_m \quad (I)$$

where m is 1 or 2 n is from 1 to 100, $R^1$ is a monovalent $C_2$–$C_{35}$-hydrocarbon radical when m is 1 and a divalent $C_2$–$C_{30}$-hydrocarbon radical when m is 2, and $R^2$ and $R^3$ are each hydrogen, $C_1$–$C_{12}$-alkyl, $C_5$–$C_7$-cycloalkyl, $C_6$–$C_{10}$-aryl, a polyalkyleneamine radical or alkanolamine radical having from 1 to 5 nitrogen atoms, where the radicals may be identical or different and, together with the nitrogen atom to which they are bonded, may form a five-membered or six-membered ring in which further hetero atoms may be incorporated, and D is $C_2$–$C_5$-alkylene.

The present invention furthermore relates to the use of the mixtures and fuels for gasoline engines, which contain the components A and B.

The carburetor and intake system of gasoline engines as well as injection systems for metering fuel into gasoline and diesel engines become increasingly contaminated by impurities which are caused by dust particles from the air, uncombusted hydrocarbon residues from the combustion chamber and the vent gases from the crankshaft casing which are passed into the carburetor.

The residues adsorb fuel and change the air/fuel ratio during idling and in the lower part-load range so that the mixture becomes richer, the combustion more incomplete and in turn the amounts of uncombusted or partly combusted hydrocarbons in the exhaust gas become greater and the gasoline consumption increases.

It is known that the intake system of gasoline engines can be kept clean by adding detergents (cf. for example M. Rosenbeck in Katalysatoren, Tenside, Mineral-öladditive, Editors J. Falbe and U. Hasserodt, page 223 et seq., Thieme Verlag, Stuttgart 1978, and Ullmann's Encyclopedia of Industrial Chemistry, Vol. A 16, 719 et seq., 1990, VCH Verlagsgesellschaft). Emissions and fuel consumption are thus reduced and the driving characteristics are improved. The principle of the molecular composition of such detergents may be described generally as the linking of polar structures to generally relatively high molecular weight lipophilic radicals. Typical examples of these are products based on polyisobutene having amino groups as polar groups, as described in EP-A 244 616.

A further important additive component for fuels is a carrier oil. These carrier oils are as a rule high-boiling heat-stable liquids. EP-A 356 726 discloses esters of aromatic polycarboxylic acids with long-chain alcohols as carrier oils. U.S. Pat. No. 5,112,364 describes polyetheramines having terminal alkylphenol or alkyl-cyclohexyl groups as fuel additives which have in particular good valve-cleaning properties.

WO-A 91/03529 describes the combination of detergents which carry certain amino groups with polyether alcohols as carrier oils. This combination in particular contributes to a lesser extent than its individual components to the octane requirement increase (ORI), which is due to deposits of the fuel or the additives on engine parts. A new engine reaches its final octane requirement only after a considerable running time, after which said requirement may be considerably higher than at the beginning. In general, additives should at least not reinforce this effect.

A considerable disadvantage of the stated combination of additives is the unsatisfactory miscibility of the detergent with the carrier oil. Cloudy mixtures which cannot be added to the fuels frequently result. Phase separation frequently occurs in these mixtures after prolonged stoppage. The distribution of the detergent in the mixture is thus inhomogeneous. In practice, however, the additive packages required are those which contain all components in dissolved form and which can be added to the fuel in one process step.

It is an object of the present invention to provide a combination of a detergent and a carrier oil component which, in addition to the properties of having a valve-cleaning effect in fuels and not adversely affecting the ORI compared with fuels without additives, remain thoroughly miscible with one another.

We have found that this object is achieved by the mixtures defined above, which contain a detergent A and a polyetheramine B of the formula I. We have also found the use of these mixtures, and fuels which contain the components A and B.

Component A

The component A is effective in fuels primarily as a detergent. Suitable components A are amines, polyamines or alkanolamines which possess a hydrocarbon radical having an average molecular weight of from 500 to 10,000, preferably from 600 to 2,500, particularly preferably from 700 to 1,500.

The hydrocarbon radical is, as a rule, branched. In general, it is a radical which is obtainable by polymerization of olefins. These olefins are preferably $C_2$–$C_6$-olefins, such as ethylene, propylene, 1-butene, 1-pentene and particularly preferably isobutene. Both homopolymers and copolymers, for example polymers of from 70 to 95 mol % of isobutene and from 5 to 30 mol % of 1-butene, are suitable. As a result of their preparation process, these polyolefins generally consist of a mixture of compounds having different molecular weights.

After chlorination, these polyolefins can be reacted with amines in a conventional manner. However, hydroformylation of the polyolefin and amination of the resulting aldehyde and alcohol mixture under hydrogenation conditions (cf. EP-A 244 616) are preferred since this method leads to chlorine-free products. The amino group of the detergent A is derived from conventional amines, such as ammonia, primary amines, such as methylamine, ethylamine, butylamine, hexylamine or octylamine, secondary amines, such as dimethyhlamine, diethylamine, dibutylamine or dioctylamine, and heterocycles, such as piperazine, pyrrolidine or morpholine, which may carry further inert substituents. Polyamines, such as ethylenediamine, propylenediamine, diethylenetriamine, triethylenetetramine, hexamethylenediamine, tetraethylenepentamine and dimethylaminopropylamine, as well as various alkylenecarrying polyamines, such as ethylenepropylenetriamine, may also be mentioned as starting materials for the preparation of the detergents A. Examples here are alkanolmonoamines, such as ethanolamine, and alkanolpolyamines, such as aminoethylethanolamine. Among these, the polyamines are preferred, in particular ethylenediamine, diethylenetriamine and triethylenetetramine. However, ammonia is very particularly preferred.

Component B

The novel mixture contains, as the carrier oil, a polyetheramine of the general formula I

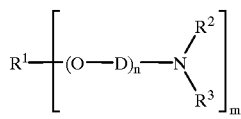
(I)

Specifically, the variables have the following meanings:
m is 1 or 2, preferably 1.

n indicates the number of repeating oxyalkylene units and is from 1 to 100, preferably from 5 to 50, in particular from 7 to 30.

The radicals $R^1$ are different hydrocarbon radicals. Where m is 1, $R^1$ is a monovalent $C_2$–$C_{35}$-hydrocarbon radical. Straight-chain aliphatic radicals, such as n-hexyl, n-octyl, n-nonyl, n-decyl, n-undecyl, n-dodecyl and n-tridecyl, are suitable, as well as branched aliphatic radicals, such as 2-ethylhexyl, isobutyl and tert-butyl. Aryl radicals, such as phenyl, and alkyl-substituted phenyl radicals, including in particular $C_6$–$C_{16}$-substituted phenyl radicals, such as octylphenyl, nonylphenyl and dodecylphenyl, may also be mentioned. The alkyl radicals are preferably in the 2- and 4-position of the phenyl ring. Commercial mixtures of the positional isomers may also be used. Compounds which are polysubstituted by alkyl are also suitable.

Where m is 2, $R^1$ is a divalent $C_2$–$C_{30}$-hydrocarbon radical, such as alkylene, eg. ethylene, propylene, butylene or hexylene. However, radicals which are derived from polyphenols, such as bisphenol A (2,2-bis-(4-hydroxyphenyl)-propane, 1,1-bis-(4-hydroxyphenyl)-ethane, 1,1-bis-(4-hydroxyphenyl)-isobutane, 2,2-bis-(4-hydroxy-3-tert-butylphenyl)-propane and 1,5-dihydroxynaphthalene by formal elimination of the hydroxyl groups are preferred.

$R^2$ and $R^3$ may be identical or different. They are each hydrogen, $C_1$–$C_{12}$-alkyl, such as methyl, ethyl, n-propyl, isopropyl, n-butyl, hexyl or octyl, $C_5$–$C_7$-cycloalkyl, such as cyclopentyl or cyclohexyl, $C_6$–$C_{10}$-aryl, such as phenyl, polyalkyleneamine radicals which have from 1 to 5 nitrogen atoms and are derived from polyalkyleneamines such as diethyleneamine, triethylenediamine, tetraethylenetriamine, tetraethylenepentamine and dimethylaminopropylamine. Suitable alkanolamines are alkanolmonoamines, such as ethanolamine, and alkanolpolyamines, such as aminoethylethanolamine. Furthermore, the radicals together with the nitrogen atom to which they are bonded may form a five-membered or six-membered ring, such as piperidine or piperazine. The heterocyclic structure may carry inert substituents, as in 2-amino-ethylpiperazine. The ring may contain further hetero atoms, such as oxygen, as in morpholine.

D is $C_2$–$C_5$-alkylene, such as ethylene, 1,2-propylene or butylene. $C_3$- and $C_4$-alkylene groups are preferred. Where n is greater than 1, the radicals D may be identical or different. The units —$(OD)_n$— may be present as homopolymers or as block copolymers. However, polymers in which the various radicals are randomly distributed are most easily obtainable.

The polyetheramines I are known per se or can be prepared by known methods (U.S. Pat. No. 5,112,364).

For this purpose, an alcohol $R^1$—OH is generally reacted with n equivalents of an alkylene oxide in the presence of a strong base, such as potassium tert-butylate at elevated temperatures with formulation of a polyether of the formula II

(II)

The variables have the same meanings as stated above. These polyethers are then subjected to amination by a conventional method in a further reaction stage, generally without further pretreatment. Amination is understood here as meaning the reaction of the polyether with ammonia or with a primary amine or polyamine, the terminal hydroxyl group being replaced by an amino group with elimination of water (Houben-Weyl, Methoden der Organischen Chemie, Volume 11/1, Chapter IIb, pages 108–134, 4th Edition, Thieme-Verlag, (1957)).

The novel mixtures consist essentially of the detergent A and the polyetheramine I as component B. The mixtures contain, as a rule, from 15 to 95, preferably from 30 to 80, % by weight of component A and from 5 to 85, preferably from 20 to 70, % by weight of component B.

In addition, the novel mixtures may contain further components C, the amounts of C being from 0 to 40, preferably from 0 to 10, % by weight, based on the total weight of components A and B. These components C have only a slight influence on the properties of the novel mixtures when the latter are used in fuels.

The component C comprises conventional additives for mixtures which are added to fuels. They are understood as being corrosion inhibitors, demulsifiers, detergents or dispersants, such as amides and imides of polyisobutylsuccinic anhydride, and also carrier oils, such as esters of carboxylic acids or polycarboxylic acids and alkanols or polyols (cf. DE-A 38 38 918).

The present invention furthermore relates to fuels for gasoline engines, which contain small amounts of the components A and B.

Suitable fuels are leaded and unleaded regular and premium-grade gasoline. The gasolines may contain components other than hydrocarbons, for example alcohols, such as methanol, ethanol or tert-butanol, and ethers, such as methyl tert-butyl ether.

The novel fuels contain each of the components A and B in general in amounts of from 10 to 5,000 ppm, preferably from 50 to 1,000 ppm, based on the total weight. In addition to the components C described above, the novel fuels may also contain antioxidants, eg. N,N'-di-sec-butyl-para-phenylenediamine, as stabilizers, eg. N,N'-disalicylidene-1,2-diaminopropane.

The components A and B can be mixed to give clear, homogeneous solutions. Fuels to which the latter have been added result in substantially less valve deposits than the pure fuels. Furthermore, the additives do not contribute to an octane requirement increase (ORI).

EXAMPLES

Preparation Examples

Example 1

Preparation of a polyether II, where m is 1, n is 24, $R^1$ is nonylphenyl and D is 1,2-propylene 740 g (3.36 mol) of nonylphenol and 55 g of potassium tert-butylate are reacted with 4.68 kg (80.6 mol) of propylene oxide at 130° C. and 4 bar while stirring. After 3.5 hours, the mixture was worked up to obtain the product. 5.40 kg of the polyether remained.

Example 2

Preparation of a polyetheramine I, where the variables have the meanings stated in Example 1 and furthermore $R^2$ and $R^3$ are each hydrogen 362 g (0.3 mol) of the polyether according to Example 1 were heated with 500 ml of ammonia and 50 g of Raney nickel at 225° C. and at a hydrogen pressure of 280 bar for 4 hours. 330 g of product were obtained and the degree of amination was 96% (total amine number 44.6 mg KOH/g).

A polyisobutyamine PIBA having an average molecular weight of 1,000 (prepared as described in EP-A 244 616) was used as component A in the experiments below.

Use Examples

Mixing Experiments

The polyether or aminated polyether prepared in Examples 1 and 2, respectively, was mixed with PIBA in the weight ratios 1:1, 2:1 and 1:2, and the homogeneity of the solution was visually assessed.

| Mixing ratio | 2:1 | 1:1 | 1:2 |
|---|---|---|---|
| PIBA + polyether | very cloudy solution | 2 phases | 2 phases |
| PIBA + aminated polyether | clear, homogeneous solution | clear, homogeneous solution | clear, homogeneous solution |

Engine Test

Determination of valve deposits in an Opel Kadett according to CEC-F-02-T-79.

In the engine tests, combinations of PIBA with the polyether according to Example 1 or with the aminated polyether according to Example 2 were tested for their efficiency in keeping the intake valves clean.

Fuel: Unleaded Premium-Grade European Gasoline

| Product | Amount of additive (mg/kg) | Average valve deposits in mg |
|---|---|---|
| Basic value (without additive) | — | 386 |
| PIBA + polyether according to Example 1 | 200 200 | 81 |
| PIBA + aminated polyether according to Example 2 | 200 200 | 0 |

The substantially higher efficiency of the novel combination of PIBA with the aminated polyether compared with the combination of PIBA with the polyether according to Example 1 is evident.

Determination of the Octane Requirement Increase ORI

General Method of Measurement:

The octane requirement increase is measured in a 400 hour long-term test in a Mercedes-Benz M 102 E engine. In the engine used, the cylinder head is equipped with 4 pressure sensors. These sensors are installed so that the pressure membranes are mounted virtually without a straight channel in the wall of the combustion chamber. It is thus possible to record the pressure in the combustion chamber without whistle vibrations which falsify the result.

With the indexing apparatus connected for evaluation and consisting of 4 quartz sensors and a commercial indexing apparatus (AVL-Indiskop), the pressure variations in the range of interest for each combustion, extending from a crank angle of 30° before the upper dead center to a crank angle of 30° after the upper dead center, can be monitored. A built-in computer permits the evaluation of the course of the combustion. The pressure signals of the individual cylinders can be averaged and can be evaluated in various computational operations. It has proven advantageous to apply the heat law in order to measure knocking in the limiting region.

This function serves for rapid calculation of the heat curve (=heat liberation per ° crank angle), of the integerated heat curve (cumulative heat liberation) and of the curve for the mean gas temperature. This is a simplified algorithm which calculates, from the pressure variation in the combustion chamber, the energy effectively supplied to the gas. The heat actually liberated during the combustion is higher by an amount corresponding to the energy loss through the wall (about 20%).

The heat liberation in the interval considered is calculated from the difference between the actual pressure at the end of the interval and the pressure value resulting in the case of pure adiabatic compression/expansion in the interval.

$$Q_{1-2} = m \cdot c_v (T_2 - T_{2'})$$

$$T_2 = \frac{P_2 \cdot V_2}{m \cdot R} \quad T_{2'} = \frac{P_{2'} \cdot V_{2'}}{m \cdot R}$$

$$P_{2'} = P_1 \cdot \left(\frac{V_1}{V_2}\right)^n$$

P=Actual pressure
P'=Pressure with adiabetic compression/expansion
m=Mass of the fuel/air mixture
$c_v$=Specific heat
   v=constant
R=Gas constant
n=Polytropic exponent $$Q_{1-2} = \frac{c_v}{R} \cdot V_2 \left(P_2 - \left(P_1 \left(\frac{V_1}{V_2}\right)\right)^n\right)$$

Approximate values for $c_v$ and n.

$$c_v = 0.7 + T0.001 \cdot (0.155 + A),$$

A=0.1 for gasoline engines $$n = 1 + \frac{0.2888}{c_v}$$

The values thus calculated for the energy conversion $$\text{in} \quad \frac{KJ}{kg \cdot ° \text{ crank angle}} \quad \text{or} \quad \frac{KJ}{m^3 \cdot ° \text{ crank angle}}$$

clearly indicate disturbances in the energy conversion due to combustion with knocking.

It is thus possible to recognize the head threshold with minimum knocking. By means of existing fuels having known octane numbers, the octane requirement of the engine under certain load conditions can thus be determined readily and reproducibly.

Fuel: Unleaded Premium-Grade European Gasoline

| Product | Amount of additive (mg/kg) | Octane requirement increase ($\Delta$ ON) |
|---|---|---|
| Basic value (without additive) | — | 3.1 |
| PIBA + polyether according to Example 1 | 200 200 | 8.1 |
| PIBA + aminated polyether according to Example 2 | 200 200 | 2.9 |

While the combination of PIBA with polyether leads to an increase of 4.3 octane numbers and hence an increase by more than 1 octane number compared with the value for the fuel without an additive, an octane requirement increase of only 2.9 was measured for the combination of PIBA with the aminated polyether.

We claim:

1. A mixture suitable as a fuel additive comprising a
    A) polyisobutyl amine in which the polyisobutyl radical has an average molecular weight of from 750 to 1500, prepared by hydroformylation of the corresponding polyolefin and amination of the resulting aldehyde and alcohol mixture under hydrogenating conditions, and
    B) at least one polyetheramine of the formula I

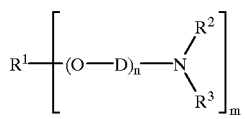

(I)

where m is 1 or 2 n is from 1 to 100, $R^1$ is a monovalent $C_2$–$C_{35}$-hydrocarbon radical when m is 1 and a divalent $C_2$–$C_{30}$-hydrocarbon radical when m is 2, and $R^2$ and $R^3$ are each hydrogen, $C_1$–$C_{12}$-alkyl, $C_5$–$C_7$-cycloalkyl, $C_6$–$C_{10}$-aryl, a polyalkyleneamine radical or alkanolamine radical having from 1 to 5 nitrogen atoms, where the radicals may be identical or different and, together with the nitrogen atom to which they are bonded, may form a five-membered or six-membered ring in which further hetero atoms may be incorporated, and D is $C_2$–$C_5$-alkylene.

2. A mixture as defined in claim 1, wherein the polyisobutyl radical of the component A has an average molecular weight of about 1000.

3. A mixture as defined in claim 1, wherein, when m is 1, the radical $R^1$ of component B is phenyl or $C_1$–$C_{20}$-alkyl-substituted phenyl.

4. A mixture as defined in claim 1, wherein the radical D of component B is propylene or butylene.

5. A fuel for gasoline engines, containing small amounts of a
    A) polyisobutyl amine, which carries a polyisobutyl radical having an average molecular weight of from 750 to 1500, prepared by hydroformylation of a polyolefin and amination of the resulting aldehyde and alcohol mixture under hydrogenating conditions,
    and
    B) at least one polyetheramine of the formula I

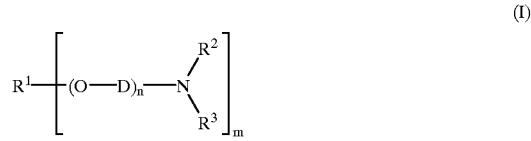

(I)

where m is 1 or 2 m is from 1 to 100, $R^1$ is a monovalent $C_2$–$C_{35}$-hydrocarbon radical when m is 1 and a divalent $C_2$–$C_{30}$-hydrocarbon radical when m is 2, and $R^2$ and $R^3$ are each hydrogen, $C_1$–$C_{12}$-alkyl, $C_5$–$C_7$-cycloalkyl, $C_6$–$C_{10}$-aryl, a polyalkyleneamine radical or alkanolamine radical having from 1 to 5 nitrogen atoms, where the radicals may be identical or different and, together with the nitrogen atom to which they are bonded, may form a five-membered or six-membered ring in which further hetero atoms may be incorporated, and D is $C_2$–$C_5$-alkylene.

6. The mixture of claim 1, wherein the polyetheramine of formula I is derived from an alkylphenolpolyether.

7. The mixture of claim 6, wherein the polyetheramine of formula I is the reaction product of an alkylphenol with an alkylene oxide and ammonia.

8. The fuel of claim 5, wherein the polyetheramine of formula I is derived from an alkylphenolpolyether.

9. The fuel of claim 8, wherein the polyetheramine of formula I is the reaction product of an alkylphenol with an alkylene oxide and ammonia.

* * * * *